United States Patent [19]

Hayashi et al.

[11] Patent Number: 4,864,362
[45] Date of Patent: Sep. 5, 1989

[54] PHOTO-PRESSURE SENSITIVE SHEET CARTRIDGE

[75] Inventors: Shigeyuki Hayashi, Ibi; Takashi Nakata, Kaizu, both of Japan

[73] Assignee: Brother Kogyo Kabushiki Kaisha, Aichi, Japan

[21] Appl. No.: 150,906

[22] Filed: Feb. 1, 1988

[30] Foreign Application Priority Data

Feb. 5, 1987 [JP] Japan .................................. 62-15803

[51] Int. Cl.⁴ .............................................. G03B 27/58
[52] U.S. Cl. ........................................ 355/72; 355/27; 352/76
[58] Field of Search ...................... 355/72, 27; 354/77; 352/75, 76

[56] References Cited

U.S. PATENT DOCUMENTS

| | | | |
|---|---|---|---|
| 1,087,996 | 2/1914 | Tessier | 352/76 |
| 1,215,534 | 2/1917 | Howell | 352/76 |
| 1,878,693 | 9/1932 | Gamble | 352/76 |
| 4,566,785 | 1/1986 | Takenouchi | 355/72 |

Primary Examiner—Monroe H. Hayes
Attorney, Agent, or Firm—Oliff & Berridge

[57] ABSTRACT

A photo-pressure sensitive sheet cartridge includes: an outlet from which a photo-pressure sensitive sheet is drawn out; a lid which closes the outlet in order to exclude the outer light; and an opening and closing lever for operating the lid to be opened or closed. When a sheet of photo-pressure sensitive paper is drawn out of this cartridge, the lid is opened in order to prevent the microcapsules on the sheet from being ruptured by pressure. While the photo-pressure sensitive sheet outside the cartridge is being exposed to light on a determined area in the copying machine, the lid is closed in order to prevent light from entering the cartridge.

15 Claims, 3 Drawing Sheets

PHOTO-PRESSURE SENSITIVE SHEET CARTRIDGE

BACKGROUND OF THE INVENTION

The present invention relates to a photo-pressure sensitive sheet cartridge installed in an exposure device such as a laser printer, a dry copying machine and the like.

Generally, a photo-pressure sensitive sheet of paper, which is installed in the exposure device, consists of two separate sheets: a sheet body and a developer sheet. A substratum of the sheet body is coated with a certain density of microcapsules, which encapsulate a chromogenic material and a photo-curable resin. The developer sheet is coated with a developer which develops a color in reaction with the chromogenic material in the microcapsules. In such kind of sheet, the development is executed in the following manner. The surface of the sheet body coated with the microcapsules is exposed to light according to the form of an original image. Thereafter, the sheet body is pressed against the developer sheet, thereby rupturing the uncured microcapsules on the unexposed areas of the sheet body. The chromogenic material effused from the microcapsules reacts with the developer so as to fix an image on the developer sheet.

If the above-stated photo-pressure sensitive sheet is exposed to light before usage, it cannot be used any more. Thus, a cartridge is devised to contain the photo-pressure sensitive sheet as a protection from light. More specifically, pieces of felt are attached to the upper and lower surfaces of a thus narrowed outlet of the cartridge, as in a film holder which contains a film for a camera. However, this cartridge has the following problem when the photo-pressure sensitive sheet is drawn out of the cartridge: the outlet of the cartridge is so narrow that the attached felt may touch and rupture the microcapsules on the unexposed part of the sheet.

SUMMARY OF THE INVENTION

It is accordingly an object of the present invention to provide a photo-pressure sensitive sheet cartridge from which a photo-pressure sensitive sheet can be drawn out without rupturing the microcapsules, and which can contain the sheet and shield it from light.

This object is attained by a cartridge of photo-pressure sensitive sheet comprising: a light-proof case provided with an outlet for a photo-pressure sensitive sheet; closing means for closing the outlet of the light proof-case in order to prevent light from entering the light-proof case through the outlet; and activation means for driving the closing means to be opened or closed.

This object is also attained by a copying machine comprising: a light-proof case containing a photo-pressure sensitive sheet and provided with an outlet for said photo-pressure sensitive sheet; closing means for closing the outlet of the light-proof case in order to prevent light from entering the light-proof case through the outlet; activation means for driving the closing means to be opened or closed; a light source for irradiating light enclosing an original image onto the photo-pressure sensitive sheet; and shutter means for permitting light from the light source to expose the photo-pressure sensitive sheet while the closing means is being closed, and for keeping out light from the light source while the closing means is open for the feeding photo-pressure sensitive sheet.

BRIEF DESCRIPTION OF THE DRAWINGS

Preferred embodiments of the present invention will now be described by way of examples and with reference to the accompanying drawings wherein.

DETAILED DESCRIPTION OF THE PREFERRED EMBODIMENTS

Hereinafter, a photo-pressure sensitive sheet cartridge, embodying the present invention in a dry copying machine, will be explained with reference to FIGS. 1 and 2.

Figure 2:
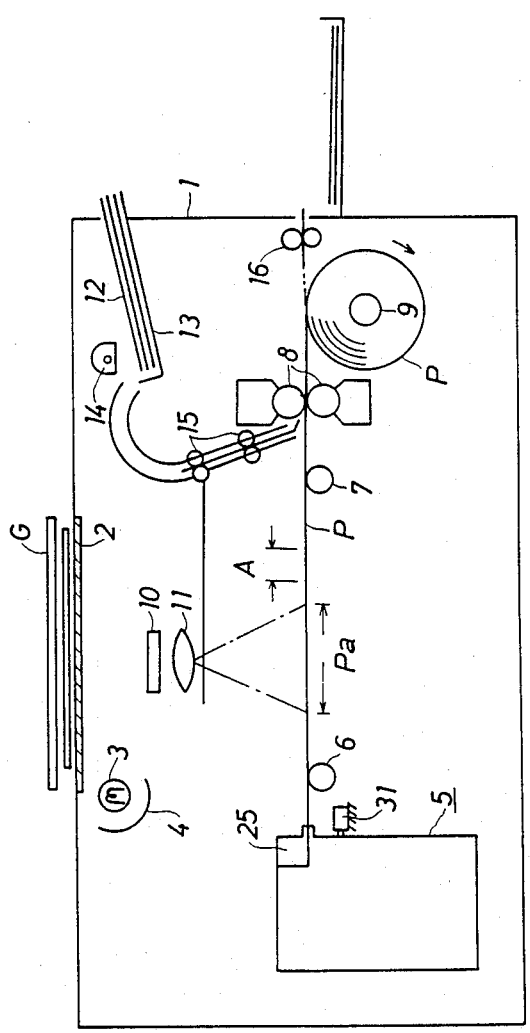
FIG. 2 is a schematic sectional view of a dry copy machine.

FIG. 2 is a schematic illustration of the dry copying machine. A copier body 1 is provided with a glass panel 2 on its upper surface. Below the glass panel 2, there are a light source 3 and a reflector 4 for irradiating an original G set on the glass panel 2. A photo-pressure sensitive sheet cartridge 5 is fixed in the lower part of the copier body 1 and contains a roll of photo-pressure sensitive paper P. The photo-sensitive sheet P is coated with a predetermined density of microcapsules (not shown) on a sheet-like substratum. Each microcapsule is encapsulated with chromogenic material and photo-curable resin. The photo-pressure sensitive sheet P which has been drawn out of the photo-pressure sensitive sheet cartridge 5 is guided by a first feeding roller 6, a second feeding roller 7 and a pair of vertically-opposed pressure rollers 8. Finally, the sheet P is wound up by a take-up roller 9. The first feeding roller 6 and the second feeding roller 7 are separated by a predetermined distance from each other, which corresonds to the size of the original G. The take-up roller 9 is rotated clockwise in FIG. 2 so as to draw the photo-pressure sensitive sheet P out of the photo-pressure sensitive sheet cartridge 5 toward an exposure area. Below the glass panel 2, there are a shutter 10 for controlling exposure time and a condenser lens 11 for forming an image out of the reflected light on an image-forming part Pa. The shutter 10 may be constructed as a mechanical shutter or as a liquid crystal element.

A developer sheet cassette 13 for containing developer sheets 12 is fixed to one side of the copier body 1. Each developer sheet 12 is coated with developer which develops color in reaction with the chromogenic material in the microcapsules on the photo-pressure sensitive sheet P. The developer sheet 12 is fed from the developer cassette 13 by a paper feed roller 14 which is attached to the outlet of the developer sheet cassette 13. Then, the developer sheet 12 is guided by a carrier roller 15 into contact with the photo-pressure sensitive sheet which has been moved from the exposure area to the pressure rollers 8. Accordingly, the developer sheet 12 and the photo-pressure senstive sheet P pass together between the pressure roller 8. As a result, the microcapsules on the unexposed part are ruptured and the chromogenic material contained therein effuses. The effused chromogenic material reacts with the developer on the developer sheet 12, whereby a picture image is fixed. The developer sheet 12 on which a picture image has been fixed comes out from the copier body 1 by way of a separation roller 16.

Figure 1:
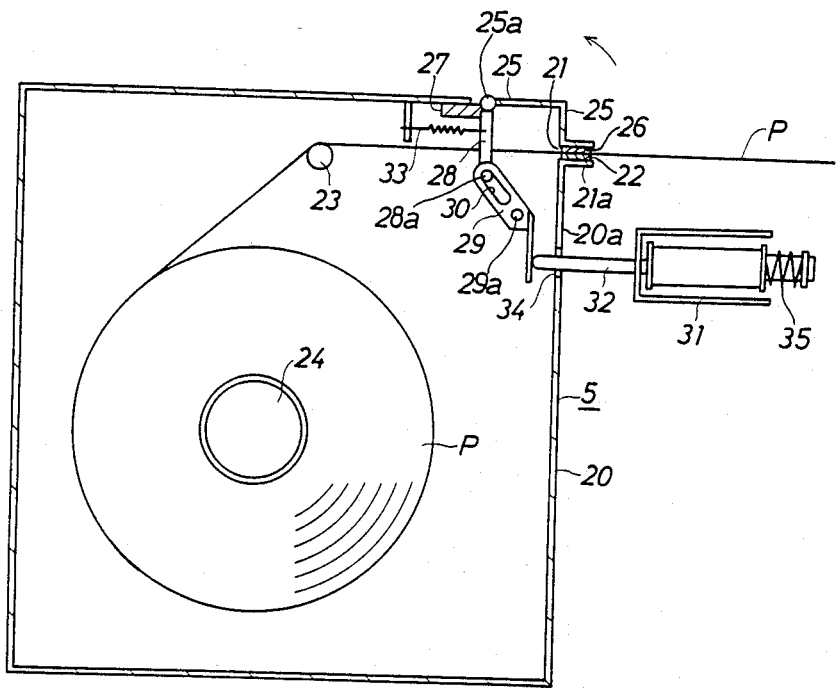
FIG. 1 is a sectional side elevation of a photo-pressure sensitive sheet cartridge in accordance with a first embodiment.

With reference to FIG. 1, the photo-pressure sensitive sheet cartridge 5 will be described in detail. A light-proof case 20 of the cartridge 5 has an outlet 21 on its upper corner from which a photo-pressure sensitive sheet P is taken out. A side wall 20a of the cartridge 20 near the outlet 21 has a protrusion 21a which is covered with a piece of felt 22. Inside the light-proof case 20, a guide bar 23 is fixed at the same level as the protrusion 21a of the outlet 21. A spool 24 is rotatably fixed at the center of the light-proof case 20. The photo-pressure sensitive sheet P is wound around the spool 24 with its front surface, i.e., the surface coated with the microcapsules, facing outside. This photo-pressure sensitive sheet P on the spool 24 is drawn out of the cartridge 5 by way of the guide bar 23 and the outlet 21.

A closing lid 25 having a step-formed cross section is rotatably fixed at an axis 25a on the upper corner of the light-proof case 20, wherein the closing lid 25 closes and opens the outlet 21. A free end of the closing lid 25 projects in the feeding direction of the photo-pressure sensitive sheet P, and the lower surface of this protrudent portion of the closing lid 25 is covered with a piece of felt 26. When the closing lid 25 closes the outlet 21, the photo-pressure sensitive sheet P which has been pulled out from the outlet 21 is held between the felt 26 on the protrusion of the closing lid 25 and the felt 22 on the protrusion 21a. Thus, the closing lid 25 keeps light from entering the light-proof case 20 through the outlet 21. Adjacent to the axis 25a of the closing lid 25, a shielding member 27 made of sponge is attached to an edge of the upper surface of the light-proof case 20, from which it extends along the width of the outlet 21. When the closing lid 25 closes the outlet 21, the shielding member 27 closes the slit near the axis 25a of the closing lid 25 so as to shut out the light therefrom.

A closing lever 28 projects downward from one end of the axis 25a of the closing lid 25. The lower end 28a of the closing lever 28 fits in a slot 30 on the upper part of a rocking lever 29 whose center is rotatably fixed at an axis 29a in the light-proof case 20. To the closing lever 28 is attached a spring 33 which forces the closing lid 25 to be closed. Outside the light-proof case 20, a solenoid 31 is attached corresponding to the lower end of the rocking lever 29. More specifically, a plunger 32 of the solenoid 31 projects into a hole 34 on the light-proof case 20 to come into contact with the lower end of the rocking lever 29. The hole 34 is provided with a shielding member (not shown), which is similar to the shielding member 27, in order to shut out the light and prevent the photo-pressure sensitive sheet P inside the cartridge 5 from being exposed to light.

According to the position of the closing lid 25, the shutter 10 in the copier body 1 controls exposure time in the following manner. While the closing lid 25 is open for feeding photo-pressure sensitive sheet P, the shutter 10 keeps out light from the light source 3. While the closing lid 25 is being closed, on the other hand, the shutter 10 permits irradiation from the light source 3 in order to form an image on the stopped photo-pressure sensitive sheet P.

Now, an explanation will be given for functions of the photo-pressure sensitive sheet cartridge 5. While the copying machine is not being operated, the solenoid 31 is kept inactive and the closing lid 25 of the photo-pressure sensitive sheet cartridge 5 remains closed due to the force of the spring 33 as shown in FIG. 1, thereby preventing the light from entering the light-proof case 20. When the copying machine is put into operation and a feed signal activates the take-up roller 9, the solenoid 31 is energized in response to or synchronously with the feed signal. As a result, the plunger 32 extends to rotate the rocking lever 29 which accordingly operates the closing lever 28, thereby opening the closing lid 25 against the action of the spring 32.

Under the above condition, a certain length of photo-pressure sensitive sheet P is withdrawn by the activation of many rollers including the take-up roller 9. To elaborate, the photo-pressure sensitive sheet P is pulled out from the outlet 21 by way of the guide bar 23 which guides the back surface of the photo-pressure sensitive sheet P, namely, the surface not coated with the microcapsules. This guide bar 23 continuously guides the photo-pressure sensitive sheet P through a certain incident angle towards the outlet 21 regardless of the winding radius around the spool 24. Therefore, the photo-pressure sensitive sheet P never comes into contact with any border of the outlet 21 which would unnecessarily rupture the microcapsules on the photo-pressure sensitive sheet P.

After the determined length of photo-pressure sensitive sheet P is withdrawn from the cartridge 5, the solenoid 31 is deenergized for the exposure of the photo-pressure sensitive sheet P. As a result, the plunger 32 is returned by a return spring 35 of the solenoid 31. Simultaneously, the closing lid 25 is returned to its closed position by the action of the spring 33 so as to shut out the outer light at the moment of exposure. In such a case that the closing lid 25 is being closed and the photo-pressure sensitive sheet P is not withdrawn, the microcapsules on the photo-pressure sensitive sheet P will be ruptured between the upper and lower felt 26 and 22. In this case, the feed action may be controlled in such a manner that the part of the photo-pressure sensitive sheet P, which microcapsules are ruptured by the felt 26 and 22, is located within a range A which does not correspond to the exposure area in the copying machine. After the exposure, the solenoid 31 is energized again in response to or synchronously with the feed signal for feeding the photo-pressure sensitive sheet P toward the take-up roller 9. Then, the closing lid 25 is opened in the same manner as already described. After the take-up roller 9 winds up the predetermined length of photo-pressure sensitive sheet P, the solenoid 31 is deenergized so that the closing lid 25 is closed.

Owing to the above-stated construction of the present invention, the photo-pressure sensitive sheet can be withdrawn from the cartridge without rupturing the microcapsules within a determined range of the sheet where an image will be formed. If this cartridge is used in an image-forming device like a dry copying machine, the lid can be closed during exposure of the photo-pressure sensitive sheet or inspection of the internal mechanism of the copying machine, thereby preventing the outer light from entering the cartridge.

Figure 3:
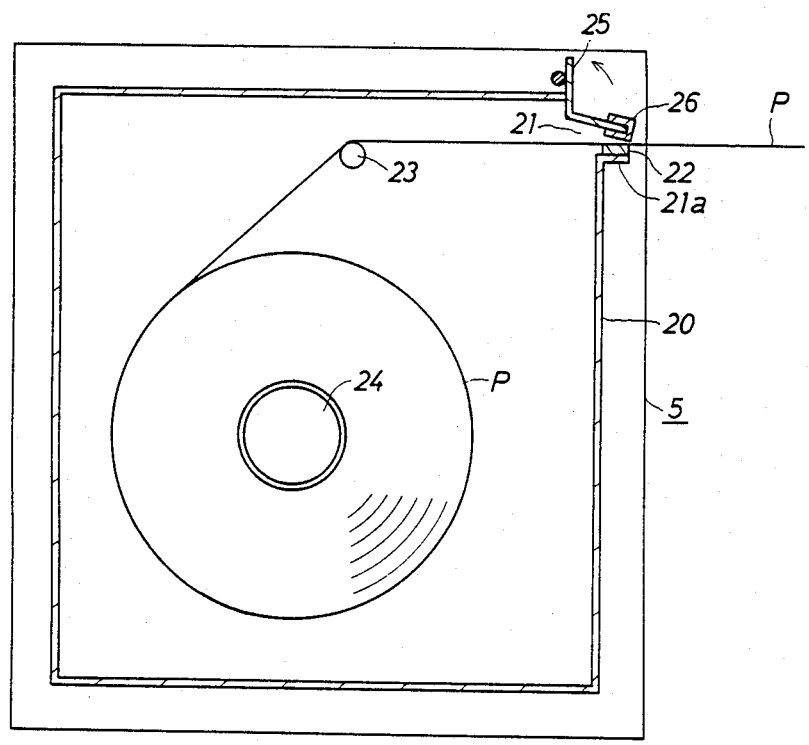
FIG. 3 is a sectional side elevation of a photo-pressure sensitive sheet cartridge in accordance with a second embodiment.
Figure 4:
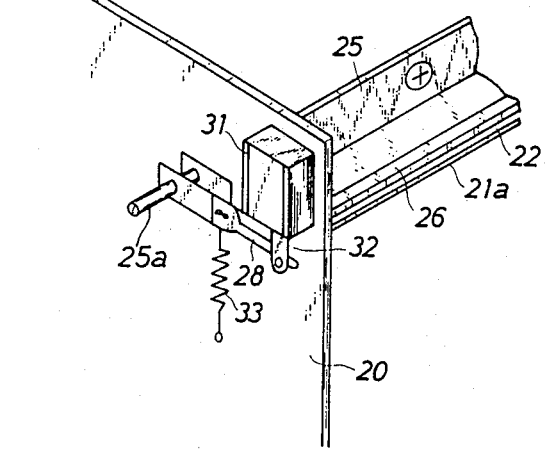
FIG. 4 is a perspective view of the main portion of the cartridge in the second embodiment.

Hereinafter, a second embodiment of the present invention will be described with reference to FIG. 3 and FIG. 4. The parts similar to those mentioned in the first embodiment are given the same numerals without further explanation. In the second embodiment, a solenoid 31 is attached to the outer side wall of the photo-pressure sensitive sheet cartridge 5. Omitting the rocking lever 29 applied in the first embodiment, a plunger 32 of the solenoid 31 is in direct connect with a closing lever 28.

Having described specific embodiments of the present invention, it is believed obvious that modification and variation—such as a manual closing lever for closing and opening the lid—is possible in light of the above teaching.

What is claimed is:

1. A cartridge containing a photo-pressure sensitive sheet and suitable for use in a copying machine comprising:
   a light-proof case provided with a photo-pressure sensitive sheet having microcapsules coated on one side and an outlet for said photo-pressure sensitive sheet;
   closing means for closing the outlet of the light-proof case in order to prevent light from entering the light-proof case through the outlet; and
   activation means for driving the closing means to be opened or closed, including means for opening said closing means only when said photo-pressure sensitive sheet is being withdrawn through said outlet and means for maintaining said closing means closed at all other times while said cartridge is mounted within said copying machine.

2. The cartridge of photo-pressure sensitive sheet according to claim 1, wherein the closing means includes a closing lid of a predetermined shape which is rotatably fixed at an axis on the light-proof case thereby closing and opening the outlet.

3. The cartridge of photo-pressure sensitive sheet according to claim 2, wherein a protrudent portion of the closing lid has a surface covered with a light shielding member selected from a piece of felt and a piece of sponge, and a wall of the light-proof case in the vicinity of the outlet has a protrusion whose surface is covered with a light shielding member abutting on the light shielding member on the protrudent portion of the closing lid when the closing means closes the outlet.

4. The cartridge of photo-pressure sensitive sheet according to claim 2, wherein the light-proof case is provided with a shielding member which is attached to an edge of one surface of the light-proof case and extends along the width of the outlet in the vicinity of the axis of the closing lid.

5. The cartridge of photo-pressure sensitive sheet according to claim 2, wherein the closing lid closes the outlet and the shielding member closes a slit near the axis of the closing lid so as to keep out light therefrom.

6. The cartridge of photo-pressure sensitive sheet according to claim 2, wherein the closing means includes: a closing lever projecting in a predetermined direction from one end of the axis of the coating lid; and a rocking lever rotatably fixed within the light-proof case, whereby one end of the closing lever fits in a slot of the rocking lever.

7. The cartridge of photo-pressure sensitive sheet according to claim 6, wherein the closing lever is fixed with a spring which forces the closing lid to be closed.

8. The cartridge of photo-pressure sensitive sheet according to claim 1, wherein a guide bar is fixed inside the light-proof case at the same level as a protrusion of the outlet.

9. The cartridge of photo-pressure sensitive sheet according to claim 8, wherein the photo-pressure sensitive sheet is wound around a spool in such a manner that one face of the photo-pressure sensitive sheet, opposite to a face coated with microcapsules, abuts on the guide bar, and the photo-pressure sensitive sheet on the spool is drawn out of the light-proof case by way of the guide bar and the outlet.

10. The cartridge of photo-pressure sensitive sheet according to claim 1, wherein the activation means includes means provided outside the light-proof case.

11. The cartridge of photo-pressure sensitive sheet according to claim 10, wherein the activation means includes a solenoid attached outside the light-proof case and a plunger projecting through a hole in the light-proof case to come into contact with one end of a rocking lever.

12. The cartridge of photo-pressure sensitive sheet according to claim 10, wherein the activation means includes a solenoid attached to the outer side wall of the light-proof case, and a plunger of the solenoid is in direct connect with a closing lever.

13. The cartridge of claim 1, wherein said outlet is sufficiently open when said closing means is in an open position to preclude breakage of the microcapsules.

14. A copying machine comprising:
   a light-proof case containing a photo-pressure sensitive sheet having microcapsules coated on one side and provided with an outlet for said photo-pressure sensitive sheet;
   closing means for closing the outlet of the light-proof case in order to prevent light from entering the light-proof case through the outlet;
   activation means for driving the closing means to be opened or closed, including means for opening said closing means only when said photo-pressure sensitive sheet is being withdrawn through said outlet and means for maintaining said closing means closed at all other times while said cartridge is mounted within said copying machine;
   a light source for irradiating light enclosing an original image onto the photo-pressure sensitive sheet; and
   shutter means for permitting light from the light source to expose the photo-pressure sensitive sheet while the closing means is being closed, and for keeping out light from the light source while the closing means is open for feeding photo-pressure sensitive sheet.

15. A cartridge of photo-pressure sensitive sheet comprising:
   a light-proof case provided with a photo-pressure sensitive sheet and an outlet for said photo-pressure sensitive sheet,
   closing means for closing the outlet of the light proof-case in order to prevent light from entering the light-proof case through the outlet, said closing means comprising a closing lid of a predetermined shape which is rotatably fixed at an axis on the light-proof case thereby closing and opening the outlet, wherein a protrudent portion of the closing lid has a surface covered with a light shielding member selected from a piece of felt and a piece of sponge, and a wall of the light-proof case in the vicinity of the outlet has a protrusion whose surface is covered with a light shielding member abutting on the light shielding member on the protrudent portion of the closing lid when the closing means closes the outlet, the shielding member adapted to close a slit near the axis of the closing lid so as to keep out light therefrom, a closing lever projecting in a predetermined direction from one end of the axis of the closing lid, a rocking lever rotatably fixed within the light-proof case, whereby one end of the closing lever fits in a slot of the rocking lever, wherein the closing lever is fixed with a spring which forces the closing lid to be closed, activation means for driving the closing means to be opened or closed, including means for opening said closing means when said photo-pressure sensitive sheet is withdrawn through said outlet and means for maintaining closing means closed at all other times, wherein a guide bar is fixed inside the light-proof case at the same level as a protrusion of the outlet, and wherein the photo-pressure sensitive sheet is wound around a spool in such a manner that one face of the photo-pressure sensitive sheet, opposite to a face coated with microcapsules, abuts on the guide bar, and the photo-pressure sensitive sheet on the spool is drawn out of the light-proof case by way of the guide bar and the outlet.

* * * * *